United States Patent
Goldberg et al.

(10) Patent No.: US 8,144,027 B2
(45) Date of Patent: Mar. 27, 2012

(54) REMOTE METER READER USING A NETWORK SENSOR SYSTEM AND PROTOCOL

(75) Inventors: Bar-Giora Goldberg, San Diego, CA (US); Gioia Messinger, Encinitas, CA (US)

(73) Assignee: AVAAK, Inc., San Diego, CA (US)

( * ) Notice: Subject to any disclaimer, the term of this patent is extended or adjusted under 35 U.S.C. 154(b) by 392 days.

(21) Appl. No.: 11/457,098

(22) Filed: Jul. 12, 2006

(65) Prior Publication Data

US 2007/0057814 A1    Mar. 15, 2007

Related U.S. Application Data

(60) Provisional application No. 60/698,134, filed on Jul. 12, 2005.

(51) Int. Cl.
G08B 23/00 (2006.01)
(52) U.S. Cl. .................................. 340/870.02; 348/160
(58) Field of Classification Search ............. 340/870.02; 348/160
See application file for complete search history.

(56) References Cited

U.S. PATENT DOCUMENTS

| | | | | |
|---|---|---|---|---|
| 5,963,650 A | * | 10/1999 | Simionescu et al. | 705/63 |
| 2004/0032504 A1 | * | 2/2004 | Shan et al. | 348/207.99 |
| 2004/0078350 A1 | * | 4/2004 | Hattori | 705/412 |
| 2005/0035877 A1 | * | 2/2005 | Kim | 340/870.02 |
| 2005/0052288 A1 | * | 3/2005 | Osterloh et al. | 340/870.02 |
| 2006/0106741 A1 | * | 5/2006 | Janarthanan | 705/412 |
| 2007/0008171 A1 | * | 1/2007 | Bowman | 340/870.02 |
| 2008/0259844 A1 | * | 10/2008 | Richeson et al. | 370/328 |

* cited by examiner

Primary Examiner — Timothy Edwards, Jr.
(74) Attorney, Agent, or Firm — Manuel F. de la Cerra

(57) ABSTRACT

A system and method is provided for automatically reading meters, such as utility meters. A camera unit is attached to or otherwise associated with an existing meter. From time to time, either automatically, or upon wireless command, the camera unit takes an image of the meter's readings, and communicates wirelessly the image or image data, to a local area receiver. The images can be transmitted immediately, or stored for later transmission, depending on the network protocol. The camera unit is battery powered, and operates communication protocols that enable extended operational life. These protocols allow for the camera's radio and processor to be turned on only when necessary, and then for only brief periods of time. At most times, the camera is in a power-conserving sleep mode. Multiple camera units may be arranged to communicate meter image data to the local area receiver, either using asynchronous or synchronous processes. In this way, star, point-to-point, MESH and ring networking topologies are enabled. The meter image data is communicated from the receiver to a central office using a wide area connection, where the image data is used for determining the meter reading. In one example, the image may be included with a utility bill as confirmed evidence of the current meter reading.

23 Claims, 9 Drawing Sheets

REMOTE METER READER USING A NETWORK SENSOR SYSTEM AND PROTOCOL

RELATED APPLICATIONS

This application claims priority to U.S. provisional patent application No. 60/698,134, filed Jul. 12, 2005, and entitled "Wireless Automatic Meter Reader (WAMR) Using Miniature Camera", which is incorporated herein in its entirety.

FIELD OF THE INVENTION

The present invention relates to automatic meter reading and specifically to an imager or miniature camera attached to a meter, and to the wireless communication of meter data to a central location. More particularly, the present invention relates to a low power meter imager that wirelessly communicates meter image data.

BACKGROUND

The field of remote sensing is growing rapidly. Remote sensing has been found to be useful in security applications, as well as for monitoring environmental, commercial and industrial processes. Remote sensing may include capturing visible light images, temperature, vibrations, seismic, infrared images, chemical or acoustic data. The remote data is either stored locally for later collection, or is transmitted via a wired or wireless connection to a data collection point. However, the use of remote imagers has been limited to applications where the remote camera has a stable power source, such as connection to a utility grid, or where the camera system can be conveniently accessed to change or charge its battery. Accordingly, the applications for remote imaging have been limited.

One application that could benefit from remote sensing is remote meter reader. Meters, such as gas, electric, water, or other utility meters, are attached to nearly every home or business. These meters are often manually read every month, requiring a utility company to send out a human meter-reader. This is an expensive and time consuming process, and since the meters are often located in private property areas, the meter-readers may be subject to dog bites, human attack, or other dangers. Due to the high cost of using human readers, some utilities use estimated bills. With an estimated bill, the utility actually reads the meter only a limited number of times per year, and based on historical records, estimates bills for the months when no reading is taken. At each reading cycle, there is a true-up, where the utility credits for any overcharge, or a larger bill to make up for underpayments. Either way, the estimated bills are a stop-gap so the utility can save money, and often leads to great consumer dissatisfaction.

Some new utility meters are being installed that have wired or wireless communication of usage data to the utility. These meters directly address the problem raised above, and in the long term, may be a satisfactory solution. However, these meters are quite expensive, and there are millions of legacy meters installed. It will take many years, if not decades, to replace and update all these meters. To date, there is no practical way to automatically read these meters.

SUMMARY OF THE INVENTION

Briefly, the present invention provides a system and method for automatically reading meters, such as utility meters by using a low power wireless camera, sensor, or imager. The camera unit is attached or otherwise associated with a meter. From time to time, the camera unit takes an image of the meter's reading area, and communicates the image or image data to a local area receiver. The camera unit is battery powered, and operates communication protocols that enable extended operational life. These protocols allow for the camera's radio and processor to be turned on only when necessary, and then for only brief periods of time. At most times, the camera is in a power-conserving sleep mode. Multiple camera units may be arranged to communicate meter image data to the local area receiver, either using asynchronous or synchronous processes. In this way, star, point-to-point, and ring topologies are enabled. The meter image data is communicated from the receiver to a central office using a wide area connection, where the image data is used for determining the meter reading. In one example, the image may be included with a utility bill as confirmed evidence of the current meter reading.

Advantageously, the camera units of the present invention may be attached to legacy meters, enabling very efficient and accurate remote meter reading. Because of the low-power protocols and structures in the camera units, in normal use the camera units will operate autonomously for up to several years. Accordingly, meter reading can be made more efficient and safe, and fully automated remote meter reading is possible, even with older legacy meters. This allows the cost, accuracy, and safety benefits of remote meter readings to be used on existing meters. In addition, frequent readings, even several times a day, are conveniently possible. This enables utility companies to track hourly usage or even charge per time of use (especially for electricity). In addition, simple imaging DSP (digital signal processing) can be applied to the meter image, and used to read the meter by the utility. This information may then be used to compare to previous readings by a computer, and create a bill without human intervention thus improving reliability and productivity. In one example, the bill may even include an image of the final meter reading.

DETAILED DESCRIPTION OF THE PREFERRED EMBODIMENT

Figure 1:
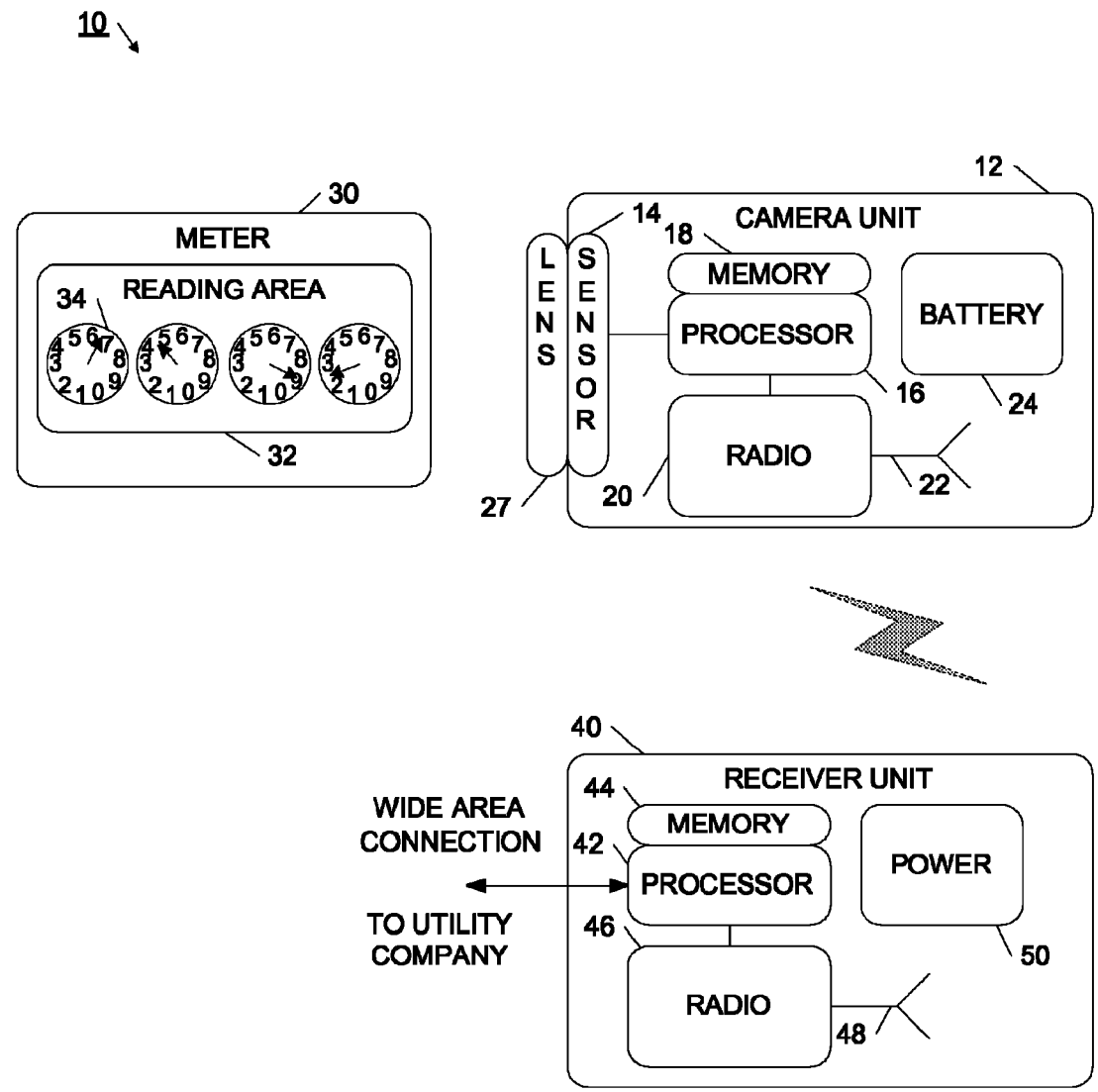
FIG. 1 is a block diagram of a meter reading system in accordance with the present invention.

Referring now to FIG. 1, an automated meter reading system is illustrated. System 10 generally comprises an imaging camera unit 12 attached to or otherwise coupled to a meter 30.

In one arrangement, the camera includes a lens or lens system and a CCD or CMOS imager. From time to time, camera unit 12 takes an image of the reading area 32 of meter 30. Reading area 32 has dials, such as dial 34, or a digital display for presenting utility usage information. The image is captured by camera unit 12, and communicated back to a receiver unit 40. In one example, receiver unit 40 is a handheld device used by a human meter reader. In this way, a person driving in a vehicle or walking a distance away from the meter can remotely and wirelessly read the meter. In another example, the receiver unit is in the residential or commercial unit for meter 30, and wirelessly receives image data. The image data may then be communicated through a wide area connection back to the utility company. In another example, the receiver unit may be a centrally located receiver or hub communicating to a network of camera units. The receiver unit may communicate with cameras in a star network arrangement, which may operate in a generally asynchronous manner, or may be arranged as a ring or other network structure requiring more synchronization. It will be appreciated that the communication processes operating between camera unit and the receiver unit 40 may be determined by the physical, electrical, and application requirements for each installation.

Advantageously, camera unit 12 may be configured to take meter readings as often as required or desirable for the utility company. For example, meter 30 may be read several times a day to assess peak utility usage. Also, the image of reading area 32 is a precise, accurate record of the reading, so any billing disputes may be immediately addressed. In one example, an image of reading area 32 may be included with a consumer bill for verification of accurate reading. As will be described below, camera unit 12 operates as a very low power imaging system. In this way, camera unit 12 operates particular network protocols for reducing power consumption. By conserving power, camera unit 12 may operate on battery 24 for several years. Since camera unit 12 may operate autonomously for years without maintenance, and provides an accurate, timely, and efficient way of reading legacy analog or digital meters, meter reading system 10 may be advantageously deployed for existing residential and commercial applications.

One example of camera unit 12 is described. Camera unit 12 has a small and compact housing for enclosing and protecting camera components. Camera unit 12 includes an imaging sensor 14 for capturing images of a meter dials or displays. The sensor may be, for example, a CMOS imager sensor for reduced power consumption, or may employ CCD imaging technology. It will be appreciated that other evolving technologies may be used to implement the sensor. The sensor may also be constructed to capture visible wavelength information, or may be set to detect other wavelengths, such as infrared. The sensor cooperates with a lens 27 to obtain the correct size and resolution of the image to facilitate automated or manual interpretation of the image. It will be appreciated that the resolution should be selected high enough to support the intended automated detection processes, if used. It will also be understood that the resolution needed will depend on dial or digit size, distance to the meter reading area, quality of lens, and other application characteristics. Of course, better resolution may support simplified and more accurate reading, but will also require more power to take and transmit the image. One skilled in the art will understand the tradeoffs and compromises between resolution, automated recognition, and power consumption. Camera unit 12 also has processor 16 for providing control and processing capability to the camera unit. For example, processor 16 may be constructed to configure and control sensor 14. In another example, processor 16 may apply image processing to captured images, for example, to compress, recognize, or encrypt image data. In one specific example, processor 16 applies a JPEG compression algorithm to images captured by sensor 14 to reduce file size while maintaining image quality.

Processor 16 may also implement network control settings and processes. For example, network control settings may define how often the camera attempts to communicate with a receiver 40, or settings regarding encryption or compression. Further, network control settings may include a unique ID for the camera 12. The unique ID may be used to associate the camera with a particular meter, and thereby be used by an accounting process to automatically and confidently assure that the proper entity is billed. In this way, a unique association is made between particular meter data and the party-to-be billed. The unique ID also enables a receiver 40 to be associated with a particular camera, which may be a hub or another camera. Camera 12 also has camera control settings. These camera control settings may set integration times for sensor 14, define capture windows, or define timing and sequential information regarding image capture.

In providing the various functions, processor 16 cooperates with local memory 18. Local memory 18 provides storage space for images captured by sensor 14, as well as memory space for application and algorithmic processes performed by processor 16. Camera 12 is intended for discrete installation, as well as long-term operation without any required maintenance. This includes for example remote operation relying fully on battery 24 for power. Depending upon network and camera settings, camera 12 may operate without battery replacement for up to three years or more. It will be appreciated that as battery technology advances, additional gains in battery life may be expected.

Battery 24 life is extended by having the camera normally operate in a sleep mode, and only activating the camera for necessary periods of time. More specifically, camera 12 normally operates in a sleep mode where radio 20 is deactivated. Further, except as discussed below, processor 16 is also deactivated. In sleep mode, the processor 16 is deactivated except for a low power timer. This low power timer draws in the range of 5 to 10 micro amps of power. The low power timer may be set to generate an interrupt at a set time or on a periodic basis. It will be understood that the resolution and stability of the clock may be selected according to application needs. For example, some asynchronous communication processes may benefit from a relatively inaccurate and unstable clock, while a synchronous system may need a better resolution clock. When the low power timer generates an interrupt signal, an interrupt activates radio 20 as well as processor 16. The camera, now being activated, acts according to its defined network controls and its camera controls. In one specific example, when the camera first wakes up, it generates a request signal through radio 20, which is transmitted by antenna 22.

After the request signal has been transmitted, the radio 20 enters a listen mode for a defined short period of time. For example, this listen mode may be opened for 20 ms to 50 ms. During this listen mode, the camera 12 is waiting to receive an acknowledgment signal from a receiver, such as a hub or another camera. If no acknowledgment signal is received during the listen period, the camera 12 goes back to sleep, which may be for a programmable time period. If however, the receiver 40 does respond, then the receiver 40 may command the camera 12 to take an action. These actions could include, to take an image, to transmit a stored image, or to go back to sleep. Of course, the camera power requirements increase dramatically while radio 20 and processor 16 are operating. However, the radio and processor operate for only a short period of time, so the overall drain is not substantial. Accordingly, it will be recognized that overall battery life is highly dependent on how often the low power timer causes the camera to wake up. For example, if the node camera 12 is set to wake up and transmit its request signal once every 10 minutes, then the battery life may extend to about three years. More frequent wake ups will result in a shorter battery life. A more complete description of low power cameras and low power protocols is provided in co-pending U.S. patent application Ser. No. 11/210,411, filed Aug. 24, 2005, and entitled "Network Sensor System and Protocol", which is incorporated herein by reference as if set forth in its entirety. It will be understood that the image can be transmitted immediately after taken or stored as a data file in the processor for later transmission, depending on the communication protocol. Each image may have a time stamp as part of the information field.

Both the camera unit and the Receiver unit include radio transceivers to enable two way communications and power-conserving networking protocols, as required by the network. Receiver unit 40 is constructed to wirelessly communicate with one or more camera units, such as camera unit 12. The receiver unit 40 has a two-way radio system 46 with antenna 48 constructed to cooperate with radios in the camera units. The receiver unit also has a processor 42 and memory 44 for performing network, control, or algorithmic processes. The receiver unit has a power source 50, which in some cases may be a persistent source such as a connection to a utility power grid. In other cases, power 50 may be from a battery or rechargeable battery. For example, if receiver unit 40 is an 802.11 access point in a residential home, then the receiver unit 40 is likely powered by connection to household power. In another example, if receiver unit 40 is a handheld portable device, then power 50 may be a rechargeable battery. In yet another example, receiver unit 40 may be another camera, in which case power 50 will be a regular battery. It will be appreciated that the type and speed of the processor and the sophistication of applications operating on the receiver unit, may in part be determined by the type of power available.

Figure 2:
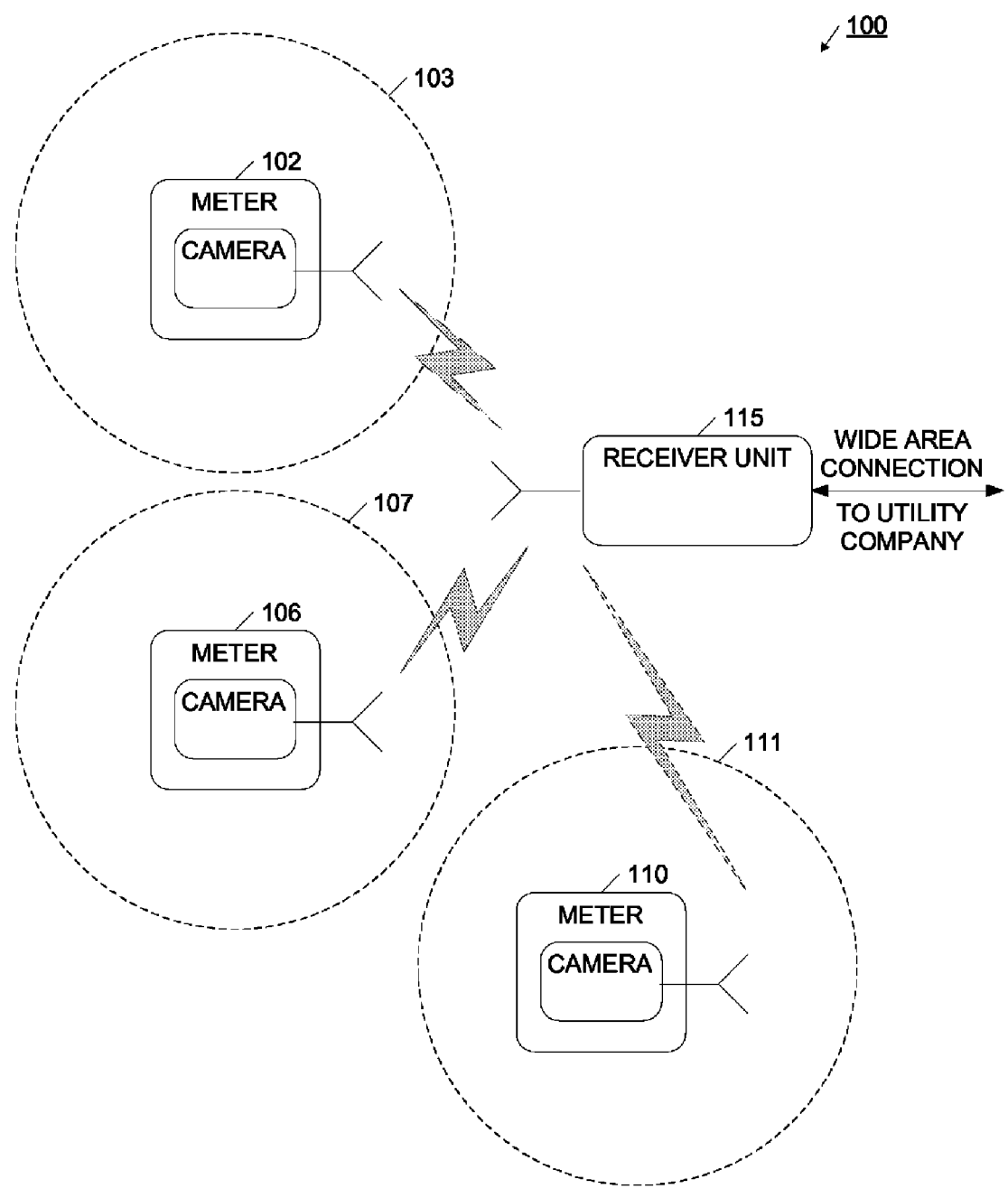
FIG. 2 is a block diagram of a meter reading system in accordance with the present invention.

Referring now to FIG. 2, a meter reading arrangement is illustrated. Arrangement 100 has multiple camera units, such as camera unit 12 described with reference to FIG. 1. Each camera unit is located in a particular geography, such as at the service entrance for a residential house, a commercial building, or an industrial site. In FIG. 2, camera 102 is located on house 103, camera 106 is located on house 107, and meter 110 is located on house 111. Each camera 102, 107, and 111 is configured to communicate wirelessly with receiver unit 115. Receiver unit 115 has a wide area connection to a utility company. In one example, receiver unit 115 is a central hub operated by the utility company. The receiver unit 115 operates an asynchronous network for controlling and receiving image data from each of the cameras. From time to time, the receiver unit 115 communicates meter reading data to the utility company. In another example, receiver unit 115 may be a portable receiver carried by a human meter reader or positioned in a utility company vehicle. In this way, the portable reader may be brought within a few hundred feet of meters, and meters automatically and wirelessly read as the receiver unit 115 moves down the street. In this way, a meter reader does not have to gain access to private areas of the house, but merely has to pass by on the public sidewalk or street areas. A portable receiver unit 115 may have a wireless connection back to the utility company, or may locally store data and then be connected to utility company servers at a later time.

Figure 3:
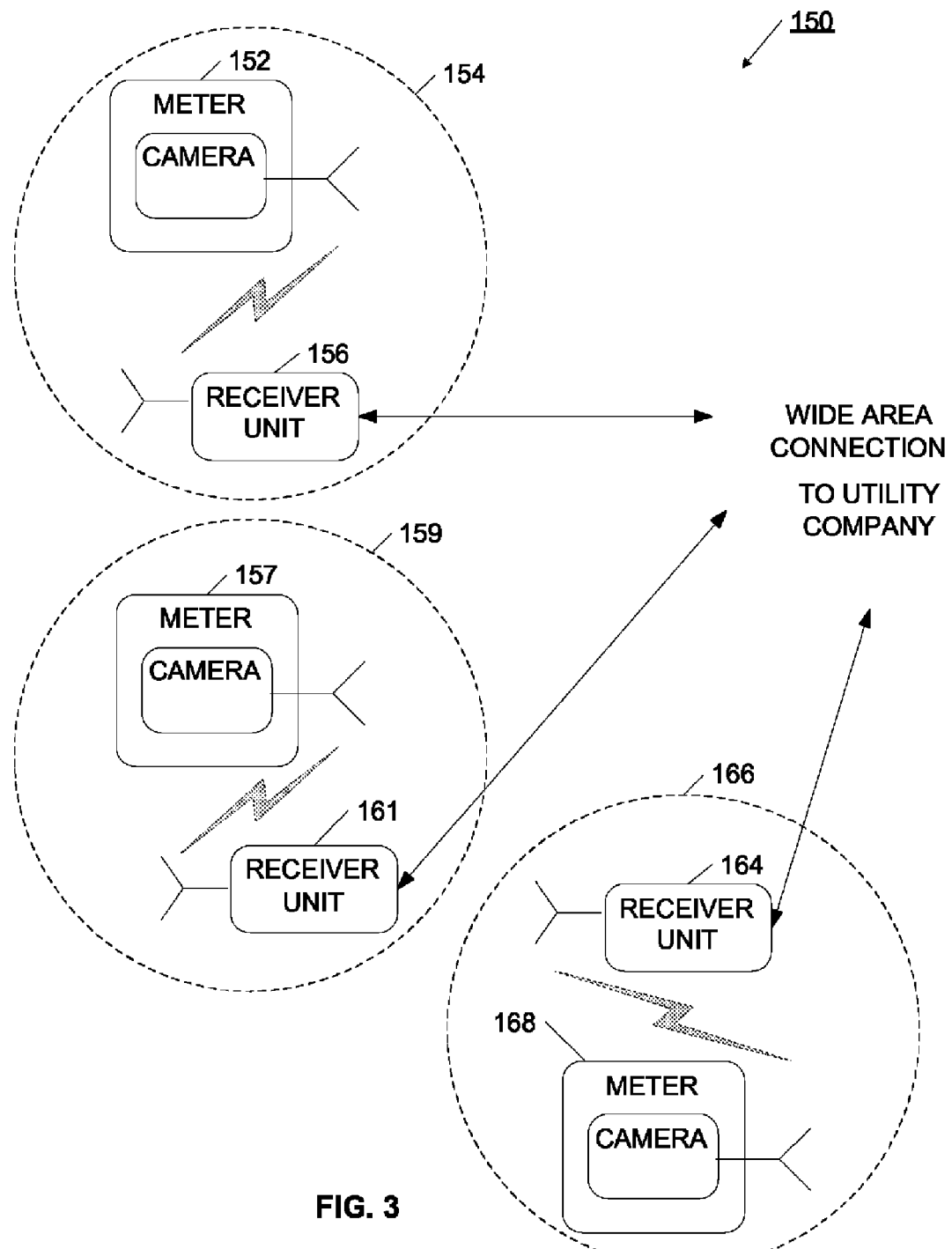
FIG. 3 is a block diagram of a meter reading system in accordance with the present invention.

Referring now to FIG. 3, another arrangement 150 is illustrated. Arrangement 150 has camera unit 152 located at house 154, camera unit 157 located at house 159, and camera unit 168 located at house 166. Each house has a receiver unit associated with it. For example, house 154 has receiver unit 156, house 159 has receiver unit 161, and house 166 has receiver unit 164. It will be appreciated that although the geographic areas of FIG. 3 are illustrated with reference to residential homes, the geographic areas may be residential apartments, commercial establishments, or industrial facilities. It will also be understood that the geographic areas may be meter areas within a single manufacturing facility. For example, the geographic areas may represent an array of meters supporting manufacturing equipment, or may be an array of meters in a utility room. The receiver units 156, 161, and 164 may be, for example, constructed to operate according to 802.11 protocols. In such a case, the associated cameras would also operate according this protocol, and enable simple communication between cameras and receiver units. In one specific example, the receiver units are also configured as Internet access points. In this way, each receiver unit has wide area connection to the utility company through an Internet connection. In this arrangement, each receiver unit obtains image information from its associated camera through an 802.11 communication, and then communicates meter data via the Internet to the utility company. This has the advantage of using existing communication modes and equipment for communication, but uses equipment not under the control of the utility company. Accordingly, receiver units may alternatively be constructed as proprietary equipment under the control of the utility company.

Figure 4:
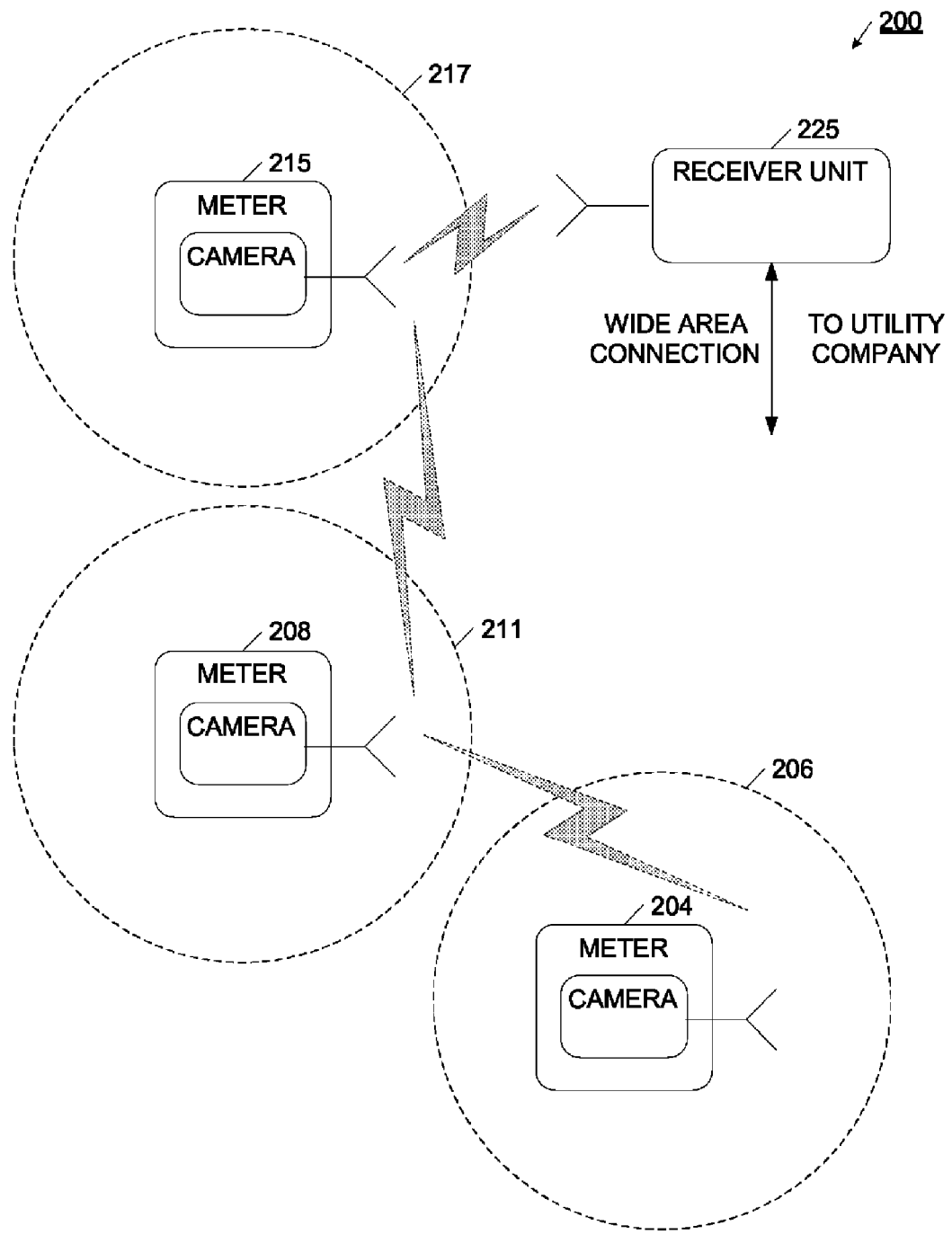
FIG. 4 is a block diagram of a meter reading system in accordance with the present invention.

Referring now to FIG. 4, another arrangement 200 is illustrated. In arrangement 200, a camera 215 is located in house 217, camera unit 208 is in house 211, and camera 204 is in house 206. Due to the geographic arrangement, a centralized hub configuration is not available. Instead, the receiver unit 225 operates at the end of a set of point-to-point connections between cameras. Receiver unit 225 again may operate according to existing protocols, or may be proprietary to the utility company. As before, receiver unit 225 is responsible for communicating meter data to the utility company through a wide area connection.

Arrangement 200 requires more synchronization then required for previous arrangements. For example, it is desirable that camera 204, 208, and 215 all wake up at about the same time. In this way, upon waking up and receiving instruction for taking an image, images taken by camera 204 may be communicated to receiver unit 225 through camera 208 and 215 respectively. Accordingly, the low-power timer in cameras in arrangement 200 is selected to operate with sufficient stability and resolution to provide the needed synchronization. It will be understood that the stability and resolution of the low power clock may be adjusted according to the synchronization processes used. For example, the cameras may be set to resynchronize from time to time, and depending upon the period between resynchronization, the stability and accuracy of the clock may be adjusted. For example, if the cameras are set to resynchronize quite often, then the low-power clocks can still be selected with relatively low resolution and stability. However, if the resynchronization period is lengthy, then the clocks will need additional stability and resolution. The trade-off between a more stable clock and resynchronization time may need to be made for each specific application. It will be understood that higher stability clocks require more power consumption during sleep mode, but that the resynchronization period consumes considerably more power than sleep mode. Therefore, a compromise can be made between the selection of clock stability and accuracy, and the resynchronization period among cameras. A specific topology for a more synchronous and cooperating network is the mesh network. It will be understood that the meter-reading system may also be arranged as a mesh, and that one skilled in the art would understand the tradeoffs and compromised required to implement and operate such a mesh network.

Figure 5:
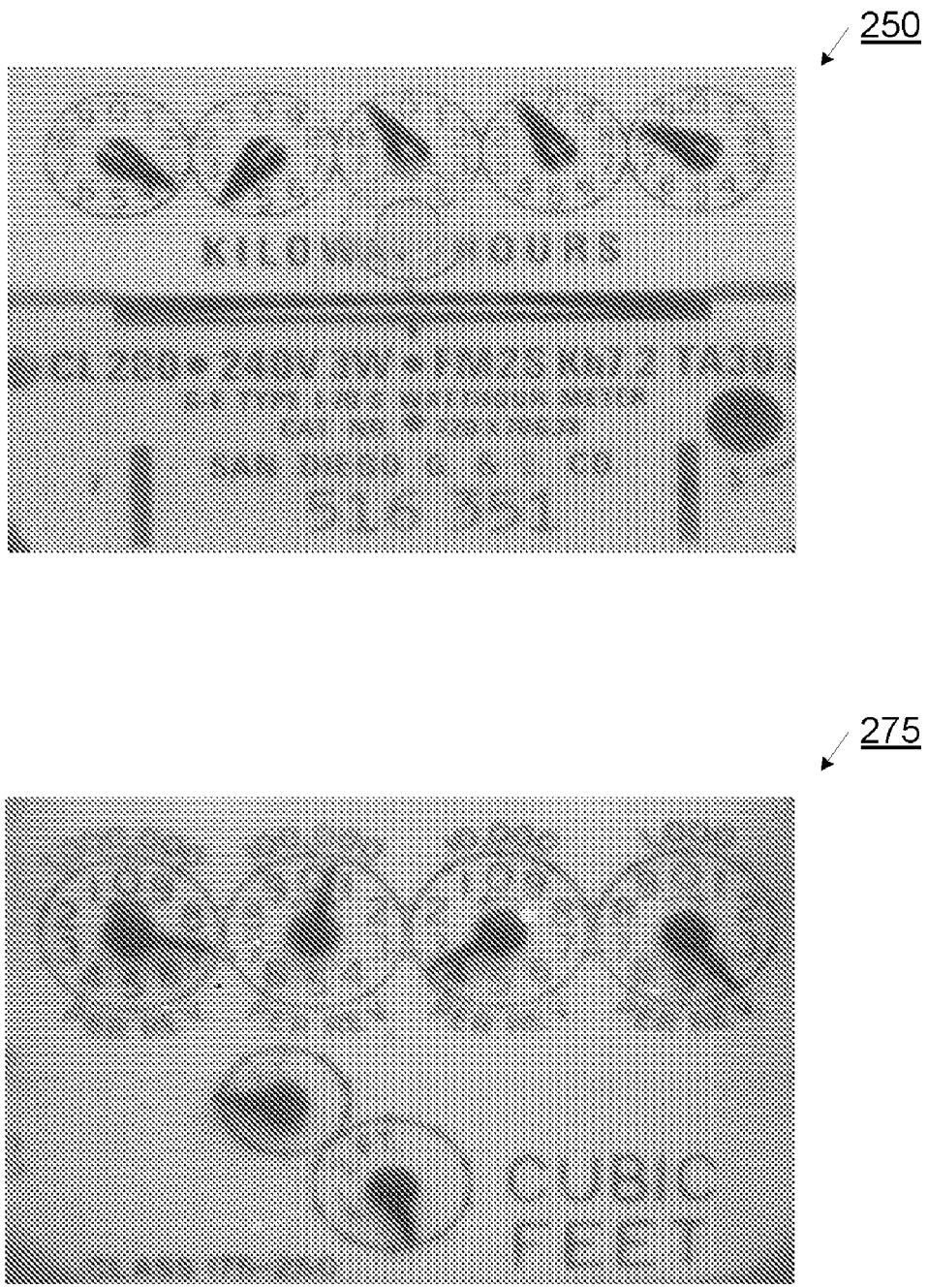
FIG. 5 is an image of meter dials taken with a meter reading system in accordance with the present invention.

Referring now to FIG. 5, meter images are illustrated. Image 250 shows a typical analog electric meter having rotational dials. These are home meter images taken by an Avaak miniature camera as described with reference to FIG. 1. A camera unit takes image 250, and the image may be automatically processed through recognition software to determine current meter readings. The automated recognition processes may be operated locally at the camera, at the central hub, or at the central utility office. The determination of where to do the automated recognition will be dependent upon available power, and the particular image environment. A copy of image 250 may also be included with a utility bill, thereby providing accurate information for consumer or commercial reference. FIG. 275 shows an analog meter reading for a typical gas meter.

Figure 6:
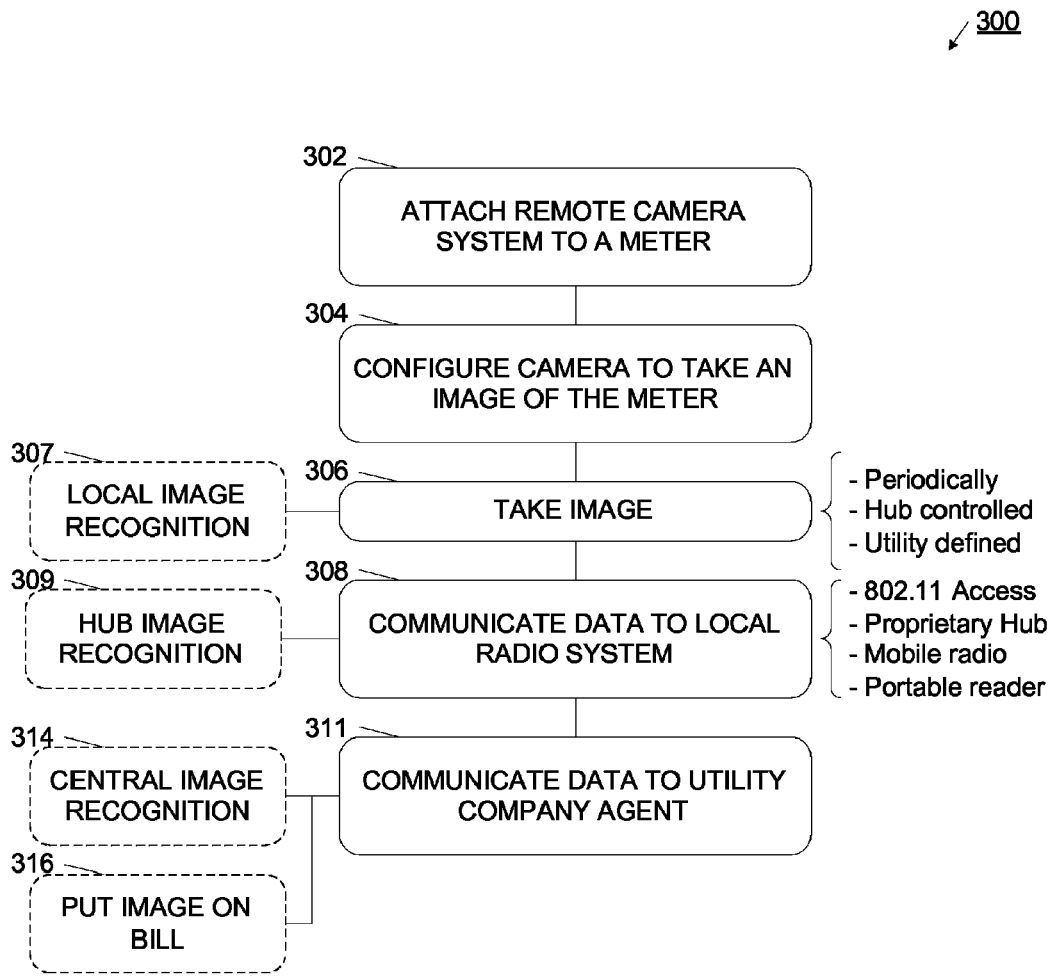
FIG. 6 is a flowchart of a method for meter reading in accordance with the present invention.

Referring now to FIG. 6, a system 300 for reading a meter is illustrated. In system 300 a remote camera sensor is attached to a meter as shown in block 302. For example, the meter may be attached or strapped to the outside of the meter housing, or may be positioned within the meter case itself. It will be appreciated that the attachment of a camera to a meter can use any of several know attachment devices or adhesives. The camera is configured to take an image of the meter as shown in block 304. For example, the camera may have one or more lenses in front of its sensor that enable the meter dials or digits to be captured with sufficient resolution to be automatically or manually deciphered. Also, the camera may have an associated lamp or lighting system for illuminating a dark meter. This lamp system may be augmented with an ambient light detection system, which illuminates the lamp only when ambient light is not sufficient. In one example, the imager itself is used to detect the level of ambient light, and responsive to unacceptably low contrast, will illuminate a lamp. In this way, the power cost of operating a lamp is only expended when necessary.

The camera then takes an image of the meter dial or digits as shown in block 306. This image may be taken periodically according to an internal clock in the camera system, or may be set or adjusted by a central controller such as a hub. In another example, the timing of the images may be defined by the utility, and communicated to the camera through a hub or other receiver. In this way, a utility may require faster rates of images during peak usage times, while allowing fewer images during off usage periods. Optionally, the image may be processed locally for image character recognition as shown in block 307. The image data is then wirelessly communicated to a local radio system as shown in block 308. This local receiver may be for example, a local 802.11 access point, a proprietary receiver or hub, a mobile radio, or a portable reader. It will be appreciated that several configurations of the radio system may be used. Since the local radio system may have additional power and processing capability, it may optionally be able to do character recognition as shown in block 309. The meter data, whether raw image or processed data, is then communicated to the utility through a wide area connection as shown in block 311. This wide area connection may be another wide area wireless system, or may be through a connected network such as the Internet.

The central office then may perform central image recognition as shown in block 314, and may also put the image on the bill for reference. The utility is then able to advantageously use the meter data for preparing timely and accurate bills. It will also be understood that the camera system may send only change information in its images. In this regard, the imager may from time to time take a reference frame of the meter dial, and thereafter send only the differences between the reference frame and the current frame. Although this requires some additional processing at the camera, such processing is relatively simple, and may reduce substantially the amount of time necessary to operate the radio. Since the radio is a relatively high power device, performing such comparison on the local radio may net cause usage of less power.

Figure 7:
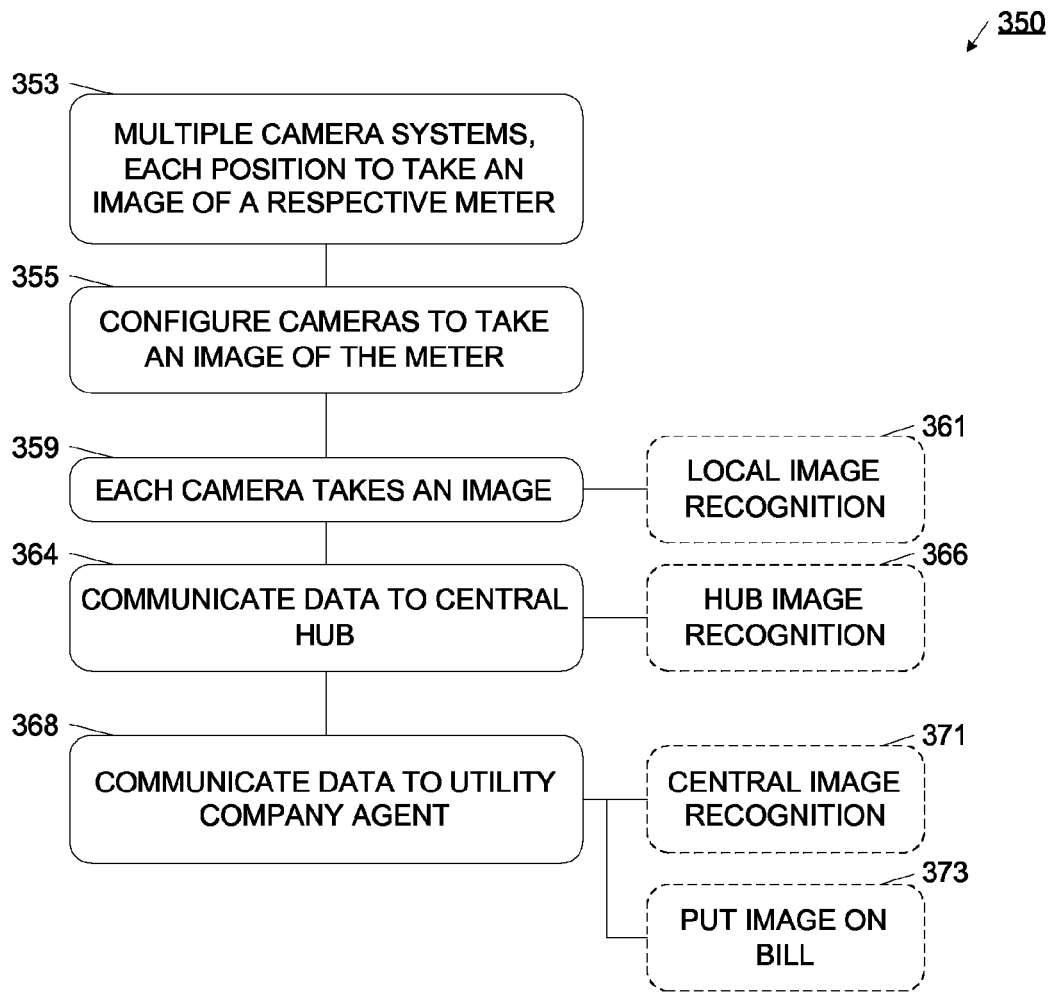
FIG. 7 is a flowchart of a method for meter reading in accordance with the present invention.

Referring now to FIG. 7, a meter reading system 350 is illustrated. System 350 has multiple camera systems, with each camera attached to a meter and positioned to take an image of that meter's dials or digits as shown in block 353. Each camera is physically and electronically configured to take an image of the meter reading area as shown in block 355. From time to time, each camera takes an image, and may apply local image recognition or other image processing as shown in block 351. Each camera communicates its image or other meter data to a central receiver hub as shown in block 364, which again may apply image recognition or other image processing algorithms. The central receiving hub then communicates the data to the utility company agent as shown in block 368. This communication may be wireless, or in a typical example, will be through a wired Internet connection. The utility agent is then able to apply additional image processing or image recognition as shown in block 371, and then put the image on the bill as shown in 373.

The multiple cameras of system 350 may operate in an asynchronous mode where each camera generates a pilot signal from time to time. The pilot signal is generated responsive to an unstable and relatively inaccurate low power clock. After generating its pilot, each camera waits a short period of time for the receiver to respond. If the receiver responds, the camera may act to take a picture or transmit data. However, if the transmitter does not respond, then the camera may go back into a sleep mode and try again a predetermined length of time later. In this way, a highly efficient and low-power asynchronous network system is enabled. In another example, the cameras may have a higher degree of synchronization due to physical, timing, or application requirements. However, when possible, such a low-power asynchronous star configuration provides desirable power savings.

Figure 8:
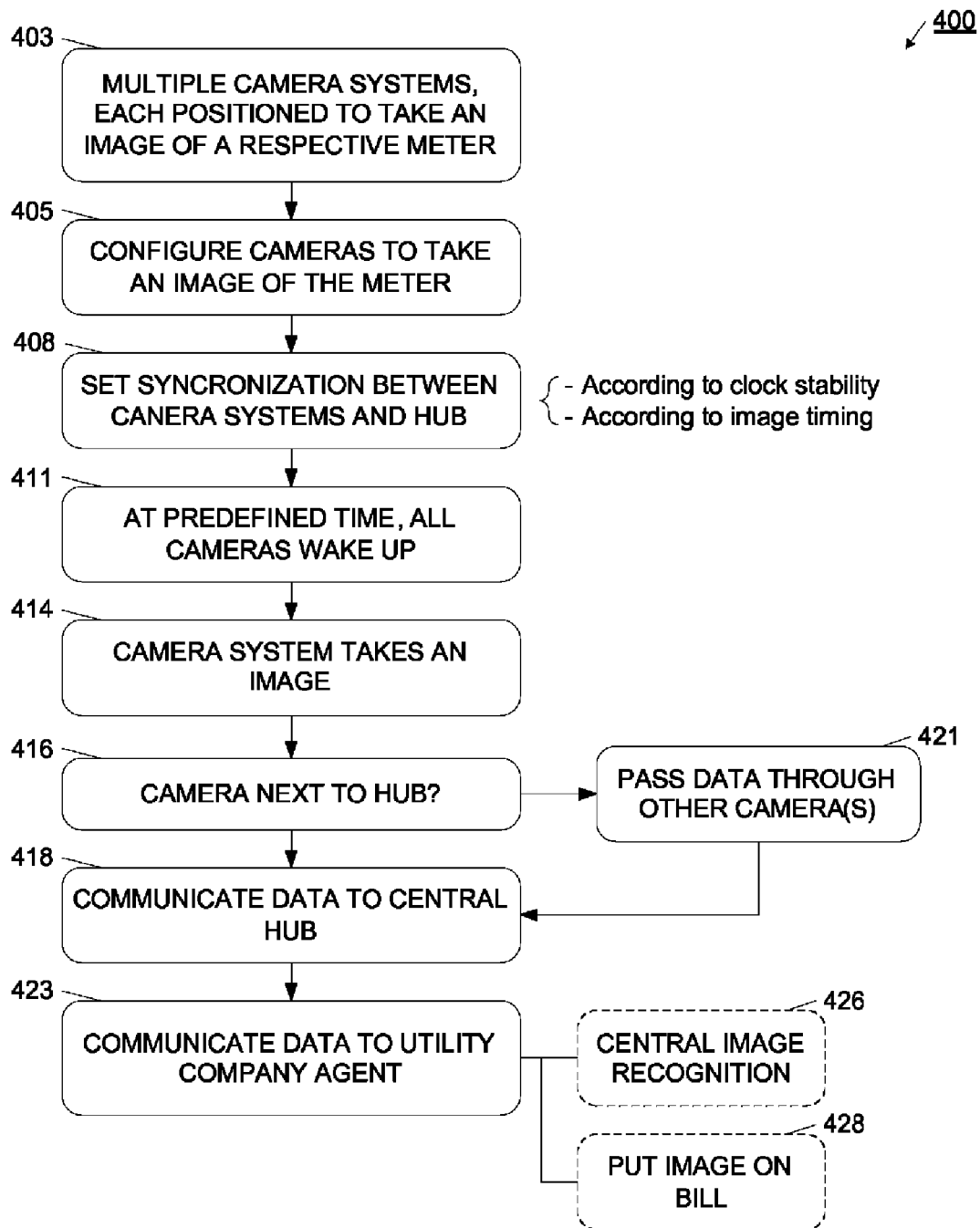
FIG. 8 is a flowchart of a method for synchronizing cameras for meter reading in accordance with the present invention.

Referring now to FIG. 8, a system for reading meters is illustrated. System 400 has multiple cameras attached to meters, and positioned to take an image from each meter as shown in blocks 403 and 405. Due to geographic or application requirements, the cameras are arranged in a ring or point-to-point network construction. In this arrangement, additional synchronization is typically required between the cameras. Again, it will be assumed that the receiver or hub has sufficient power to remain on at all times, although in some situations, the hub may also be a lower power device. As shown in block 408, the cameras are sufficiently synchronized so they generally power on at about the same time, and are then able to establish a communication path with a receiver or hub. The accuracy of this synchronization may be selected according to application needs, and involves tradeoffs between the quality and power of each camera's low power clock circuit, and according to the resynchronization cycle between cameras. Further, additional synchronization may be required for high-speed or critical applications.

At a predefined time, all the cameras wake up as shown in block 411. Typically, it will be understood that synchronization is sufficient if all the cameras wake up within a few milliseconds of each other. Of course, the tighter the synchronization, the less time the radios and processors need to be on. Again, trade-offs can be made between the quality of the low-power clock and the level of desired synchronization. Once the cameras wake up, they establish communication between each other and with the hub. Upon command, each camera takes an image as shown in block 414. The command may be generated locally, from the hub, or from the utility. Each camera has an established relationship in the network, and knows if it communicates with a camera or with a hub. If the camera is next to the hub, then that camera can communicate its data directly to the central hub as shown in block 418. However, if the camera is not next to the hub then that camera passes its data through one or more other cameras as shown in block 421. In this way, either directly, or via other cameras, the central hub obtains all the image data or other meter data, which can then be communicated to the utility company agent as shown in block 423. As described before, the utility company agent may use the information for image recognition, billing, or placing an image on the consumer's bill.

Figure 9:
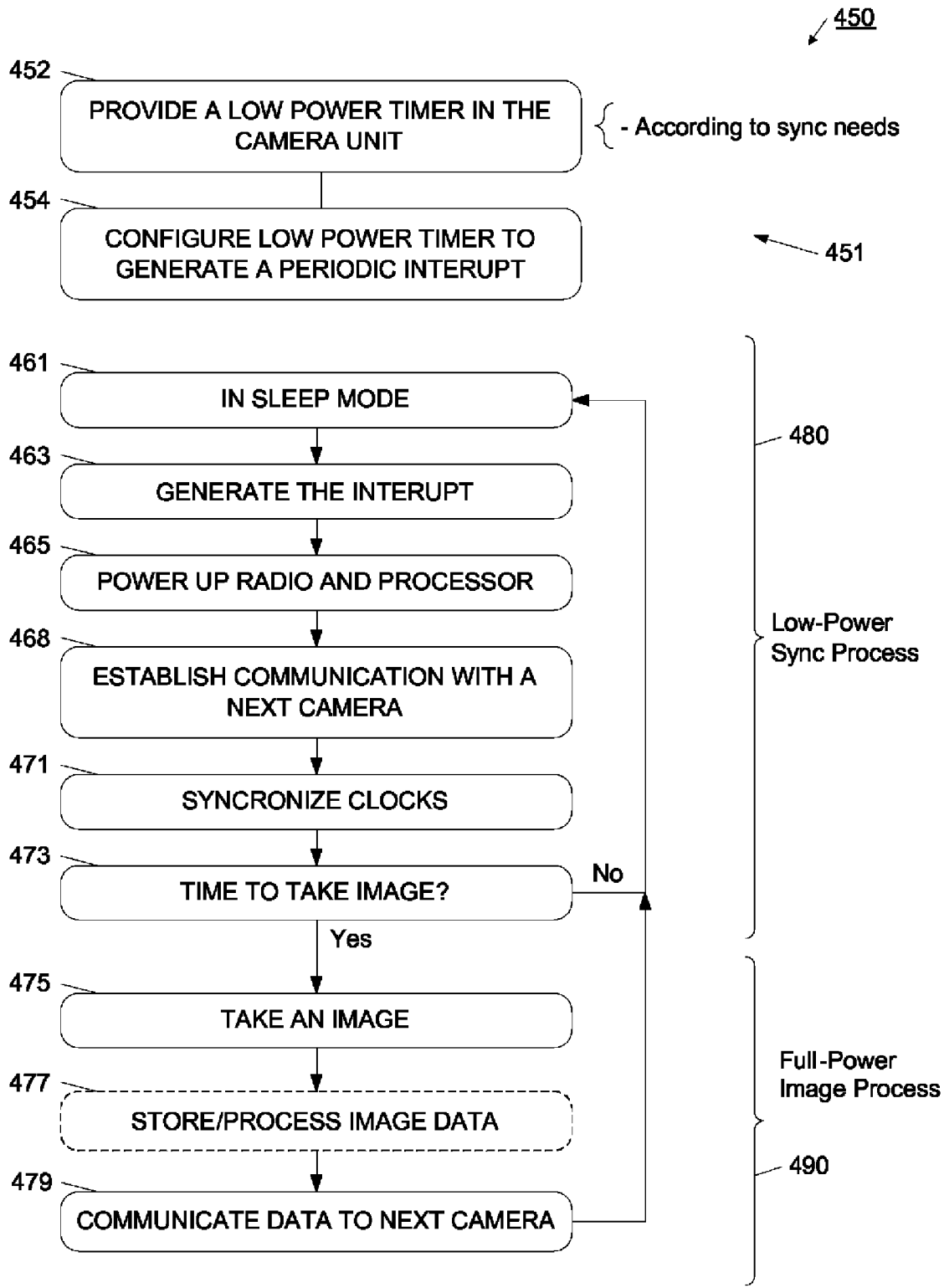
FIG. 9 is a flowchart of a method for meter reading in accordance with the present invention.

Referring now to FIG. 9, a system for synchronizing image cameras is illustrated. System 450 has a low-power timer in a camera unit as shown in block 452. The accuracy and resolution of the low-power timer is set according to the synchronization processes used in the overall network. For example, faster synchronization requirements would require a better low-power timer. In a similar manner, longer resynchronization periods would again require a better and thereby more power consuming low-power timer. Those skilled in the art will appreciate the trade-offs between timer quality and power usage and overall system resynchronization and synchronization requirements. This low-power timer is configured to generate a periodic interrupt as shown in block 454. Typically, this periodic interrupt is set according to the resynchronization cycle required by the overall network structure. In this way, the camera is configured 451 for resynchronization and operation within a synchronous data transfer environment.

The system 450 has a low-power synchronization process 480. Although the process is referred to as low-power, the process does consume power as the radio and processor is active for at least a short period of time. However, the synchronization process is considerably more power efficient than the full power imaging process 490 discussed below. In the low-power synchronization process, the camera operates in sleep mode 461 until the low-power timer generates an interrupt as shown in block 463. In sleep mode, the radio is off, as well as the processor. Typically, only minimal circuitry is operating, such as the low-power timer. Upon receiving the low-power interrupt, the radio and processor power up as shown in block 465. The radio and processor of other cameras also power up, and thereby enable each camera to establish communication with the next camera, and the last camera to establish communication with the receiver hub as shown in block 368. Upon establishing communication, the cameras synchronize clocks as shown in block 471. It will be appreciated that numerous processes may be applied for synchronizing clocks between networked devices. The cameras also inquire as to whether it is time to take an image as shown in block 473. Typically, the resynchronization interrupt will have been received many times without the need to take an image. Therefore, the camera generally goes back to sleep and waits for the next resynchronization interrupt. In one example, resynchronization may be done every few seconds. At such a resynchronization rate, a relatively inaccurate and low-power timing circuit may still be used, and the battery for the camera unit may still last years depending upon the number of images taken and communicated in process 490. Of course, it will be appreciated that other resynchronization cycles may be selected based upon application needs, quality of the low-power timer circuit, and resynchronization schedule.

From time to time, during a resynchronization process, a command will be received to take an image as shown in block 473. In such a case, each camera goes into its full-power image process as shown in block 490. In this process, each camera takes an image as shown in block 475, and then may store or process that image data locally as shown in block 477. Such storage and processing is optional, but may facilitate improved network efficiencies and collision avoidance during communications. Whether stored or not, the camera then communicates the data to the next camera or to the hub as shown in block 479. In this way, the image data from every camera is transmitted to the hub, where it is then communicated via wide area network to the utility.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. An automated wireless meter reading system, comprising:
   a camera unit adapted to be connected to a meter and with an image sensor positioned to take an image of a meter reading area, the image sensor normally operating in a sleep mode;
   a radio with the camera unit and configured to wirelessly transmit meter data from the camera, the radio constructed to wake up from time to time and send a request signal;
   a receiver unit constructed to wirelessly receive the meter data from the camera unit's radio and to send an acknowledge signal to the radio only when meter data is needed;
   a wide area connection with the receiver unit for communicating the meter data to a central location;
   a battery providing all power to operate the camera unit, image sensor, and the radio; and
   wherein the image sensor is powered only in response to the radio receiving the acknowledge signal and wherein the camera unit operates to provide the wireless meter readings from time to time for a period of more than two years prior to depletion of the battery.

2. The automated wireless meter reading system according to claim 1, wherein the camera unit further comprises:
   a lens directing the image to the image sensor;
   an antenna connected to the radio;
   a processor; and
   wherein the radio is in the camera unit.

3. The automated wireless meter reading system according to claim 1, wherein the meter is an analog or digital utility meter.

4. The automated wireless meter reading system according to claim 1, wherein the radio operates according to 802.11, CDMA, WCDMA, WiFi, WiMax, Zigbee, GSM, GPRS, EDGE, CDMA2000, UMTS, or a specialized wireless protocol.

5. The automated wireless meter reading system according to claim 1, wherein the receiver is constructed as a portable reader.

6. The automated wireless meter reading system according to claim 1, wherein the receiver is a wireless access point for the Internet.

7. The automated wireless meter reading system according to claim 1, wherein the receiver is another camera unit.

8. An automated wireless meter reading system, comprising:
- a plurality of camera units, each camera unit being positionable to take an image of a meter reading area on a respective meter;
- a receiver configured to wirelessly receive meter image data from each of the camera units;
- each camera unit comprising:
  - an image sensor positioned to take an image of a meter reading area, the image sensor normally operating in a sleep mode;
  - a radio constructed to wake up from time to time and send a request signal;
  - wherein the image sensor is powered only in response to the radio receiving an acknowledge signal;
  - wherein each camera unit has a battery providing all power to operate the camera unit radio; and
  - wherein the camera unit operates to provide the images from time to time for a period of more than two years prior to depletion of the battery.

9. The automated wireless meter reading system according to claim 8, wherein the camera units and receiver use an asynchronous communication protocol.

10. The automated wireless meter reading system according to claim 8, wherein the camera units and receiver use a star networking topology.

11. The automated wireless meter reading system according to claim 8, wherein the camera units and receiver use a synchronous communication protocol.

12. The automated wireless meter reading system according to claim 8, wherein the camera units and receiver use a point-to-point network topology.

13. The automated wireless meter reading system according to claim 8, wherein the camera units and receiver use a ring network topology.

14. The automated wireless meter reading system according to claim 8, wherein the camera units and receiver use a MESH network topology.

15. An automated process to read a meter, comprising:
- operating a camera unit using only a battery power source, the camera unit having an image sensor that is normally in sleep mode;
- operating the camera in a sleep mode until a low-power timer generates an interrupt;
- activating a radio and processor responsive to the interrupt;
- generating a pilot signal;
- waiting a defined period of time after generating the pilot for an acknowledge signal; and
- going back into the sleep mode if the acknowledge signal is not received from a receiver during the wait period, and only activating the image sensor if the acknowledge signal is received;
- taking an image of a meter reading area using the camera unit;
- wirelessly communicating image information to a local area receiver;
- communicating the image information from the receiver to a central office;
- analyzing the image to determine a current meter reading value; and
- wherein the camera unit operates to wirelessly provide the image information from time to time for a period of more than two years prior to depletion of the battery.

16. The automated process according to claim 15, wherein the analyzing step comprises automated image recognition, and is performed at the camera unit, the local area receiver, or the central office.

17. The automated process according to claim 15, wherein the camera unit further operates the steps of taking an image if a response is received from a receiver during the wait period.

18. An automated process to read a plurality of meters, comprising:
- associating a plurality of camera units with respective meters, each camera unit having a battery providing all power to operate the camera unit, each camera unit having an image sensor that is normally in sleep mode;
- operating the camera in a sleep mode until a low-power timer generates an interrupt;
- activating a radio and processor responsive to the interrupt;
- generating a pilot signal;
- waiting a defined period of time after generating the pilot for an acknowledge signal; and
- going back into the sleep mode if the acknowledge signal is not received from a receiver during the wait period, and only activating the image sensor if the acknowledge signal is received;
- taking a respective meter image with each camera unit;
- wirelessly communication meter image information to a receiver;
- communicating the meter image information from the receiver to a central office;
- analyzing the image to determine a current meter reading value; and
- wherein each of the respective camera units operates to provide the wireless meter image from time to time for a period of more than two years prior to depletion of the battery.

19. The automated process according to claim 18, further comprising periodically synchronizing clocks among the plurality of camera units.

20. The automated process according to claim 18, further including the steps of:
- associating each meter image with a customer; and
- including a copy of the meter image with its associated customer's bill.

21. The automated process according to claim 18, further including the steps of:
- using automated recognition processes to decipher the meter value indicated in the meter image to determine a current meter value; and
- using the current meter value to automatically generate a customer billing.

22. The automated process according to claim 18, further including the steps of:
- using automated recognition processes to decipher the meter value indicated in the meter image to determine a current meter value; and
- using the current meter value to automatically generate peak usage statistics.

23. The automated process according to claim 18, further including the steps of:
- taking meter images several times in a one-day period; and
- using the several meter images to determine time-of-day billing, peak usage billing, or peak usage discounts.

* * * * *